(12) United States Patent
Hall

(10) Patent No.: US 6,302,480 B1
(45) Date of Patent: Oct. 16, 2001

(54) BICYCLE SEAT WITH WEIGHT DISTRIBUTED FOR AVOIDANCE OF VASCULAR INJURY

(76) Inventor: Mark Hall, 6800 NW. 34th Ave., #161, Coconut Creek, FL (US) 33073

(*) Notice: Subject to any disclaimer, the term of this patent is extended or adjusted under 35 U.S.C. 154(b) by 0 days.

(21) Appl. No.: 09/398,596

(22) Filed: Sep. 17, 1999

(51) Int. Cl.$^7$ .................................................. B62J 1/00
(52) U.S. Cl. ...................................... 297/201; 297/195.1
(58) Field of Search ................................ 297/201, 195.1

(56) References Cited

U.S. PATENT DOCUMENTS

| | | | |
|---|---|---|---|
| 572,062 | * | 11/1896 | Peck ................................ 297/201 X |
| 603,734 | * | 5/1898 | Peck et al. ...................... 297/201 X |
| 6,095,600 | * | 8/2000 | Mattingly ............................ 297/201 |

* cited by examiner

Primary Examiner—Anthony D. Barfield
(74) Attorney, Agent, or Firm—John C. Smith

(57) ABSTRACT

A bicycle seat in which the rider's weight is distributed away from the center of the rider's body toward the buttocks and legs. Front and rear central indentations that are formed in the seat to reduce the longitudinal length in the central portion of the bicycle seat and minimize contact between the bicycle seat and the central seating area of a rider's body. An extended seating surface extends laterally outward from the longitudinal axis of the bicycle to provide a more comfortable seating area upon which the buttocks of the rider can more fully support the rider's body weight. An optional central cavity extends longitudinally along the central portion of the upper surface of the bicycle seat such that the extended seating surface is separated into separate left and right segments, each segment supporting one of the rider's buttocks. The central cavity is formed with a width and depth sufficient to minimize or eliminate contact between the central seating area of a rider's body and the upper surface of the bicycle seat such that the bicycle seat does not interfere with or injure the circulatory system of the rider in the central seating area of the rider's body. Optional left front and right front sloped surfaces extend forward and downward from the extended seating surface such that the left and right legs of the rider, respectively, are supported as the rider pedals. An optional adjustable seating surface provides additional comfort to the rider.

13 Claims, 14 Drawing Sheets

BICYCLE SEAT WITH WEIGHT DISTRIBUTED FOR AVOIDANCE OF VASCULAR INJURY

BACKGROUND OF THE INVENTION

1. Technical Field

The present invention relates to bicycle and motorcycle seats. In particular, it relates to bicycle and motorcycle seats that have a distributed seating platform that distributes weight away from the spinal and groin area of the rider, and a sloped front leg support that reduces interference of the bicycle seat with the rider's leg motion.

2. Background Art

There are currently millions of bicycles in use worldwide. Bicycles provide an inexpensive and efficient way for individuals to achieve a variety of benefits. They provide an excellent source of exercise, which in contrast to other conventional exercise devices, simultaneously allows riders the ability to enjoy the outdoors. In addition to exercise, they are used for a variety of sports, such as mountain biking, racing, etc. Many individuals rely on bicycles as transportation devices for commuting from home to work or school. In addition, many individuals use bicycles while performing their jobs. For example, couriers in large cities use bicycles because they allow faster delivery than that which would be possible if a vehicle such as an automobile was used.

While bicycles provide numerous benefits to a wide variety of riders, the design of a conventional bicycle also causes unnecessary discomfort, and potentially injurious side effects, to many riders. The principal source of rider discomfort is the design of a conventional bicycle seat. Bicycle seats have been manufactured in substantially the same structural for many years. The typical design bicycle seat includes a seating platform with an extended central extension that extends between the rider's legs. The structure results in a substantial portion of the rider's weight being supported by the extended central extension and the central portion of the seating platform.

This distribution of weight results in the bicycle seat applying pressure against a central seating area on the rider's body that extends from the lower extremity of the rider's spine to the rider's groin area. The longer the rider rides the bicycle, the more uncomfortable the seat becomes. Further, it has recently been found that prolonged bicycle riding a result and permanent physical injury to the rider. In particular, male riders who use conventional bicycle seats have constant pressure applied to the blood vessels that supply blood to the genitals. Over time, this pressure results in damage to the blood vessels which reduces the capacity of the rider's body to supply blood to the genitals. In turn, this reduced blood supply may have a substantial impact on the rider's ability to maintain an erection and may ultimately lead or contribute to impotency.

A disadvantage of conventional bicycle seats is that they do not take advantage of the buttocks and legs of the riders as a principal support for the body weight of the rider. It would be desirable to have a bicycle seat capable of distributing the weight of the rider away from the central seating area on the riders body and distributing it to the legs and buttocks of the rider such that the rider's comfort was increased, and the pressure on the blood vessels in the groin area of the rider was reduced to eliminate injury to the circulatory system and reduce blood circulation problems that may lead to serious is medical complications such as impotency.

In addition to bicycles, a variety of exercise machines used in gymnasiums use conventional bicycle seats. The seats result in the same discomfort and medical problems found in riders of bicycles.

In addition to the undesirable distribution of weight in a conventional bicycle seat, many bicycles do not provide any support to the rider's legs while peddling. This results in fatigue when peddling prolonged distances. It would be desirable to have a bicycle seat which provides support for the rider's legs without interfering with the peddling of the bicycle.

Another disadvantage associated with conventional bicycle seats is that they tend to be relatively hard and uncomfortable to sit on. Add-on cushions are known which provide a slightly softer seating surface than that typically found on a bicycle seat. However, add-on cushions do not alleviate problems caused by improper distribution of the rider's weight on the bicycle seat It would be desirable to have a bicycle seat which provides cushioned comfort to the rider while at the same time provides a weight distribution that eliminates undesirable pressure on the central seating area of a rider's body.

Those skilled in the art will recognize that motorcycle seats are often similar to bicycle seats and, as a result, they may cause or contribute to the same problems encountered by bicycle riders and users of exercise equipment.

While addressing the basic seating requirements of bicycles, motorcycles, and exercise equipment, the prior art has failed to provide a seat which distributes weight away from the groin area of the rider's body, which provides support for the rider's legs, and which provides a cushioned surface to the portions of the rider's body to which weight has been distributed.

SUMMARY OF THE INVENTION

The present invention solves the foregoing problems by providing a bicycle seat that reduces damage to the vascular system of the rider's groin area by distributing the rider's weight away from the groin area of the rider's body toward the buttocks and legs. The central extension found in conventional bicycle seats is eliminated and replaced with front and rear central indentations that are formed in the seat to reduce the longitudinal length in the central portion of the bicycle seat and minimize contact between the bicycle seat and the groin area of a rider's body. An extended seating surface extends laterally outward from the longitudinal axis of the bicycle to distribute the rider's weight outward from the central seating area of the rider's body, and to provide a more comfortable seating area upon which the buttocks of the rider can more fully support the rider's body weight. An alternative embodiment provides a central cavity that extends longitudinally along the central portion of the upper surface of the bicycle seat such that the extended seating surface is separated into separate left and right segments, each segment supporting one of the rider's buttocks. The central cavity is formed with a width and depth sufficient to minimize or eliminate contact between the central seating area of a rider's body and the upper surface of the bicycle seat such that the bicycle seat does not interfere with or injure the circulatory system of the rider in the central seating area of the rider's body. Optional left front and right front sloped surfaces extend forward and downward from the extended seating surface such that the left and right legs of the rider, respectively, are supported as the rider pedals. An alternative embodiment provides an adjustable width seating surface to provide additional comfort to the rider.

DESCRIPTION OF THE PREFERRED EMBODIMENT

Figure 1:
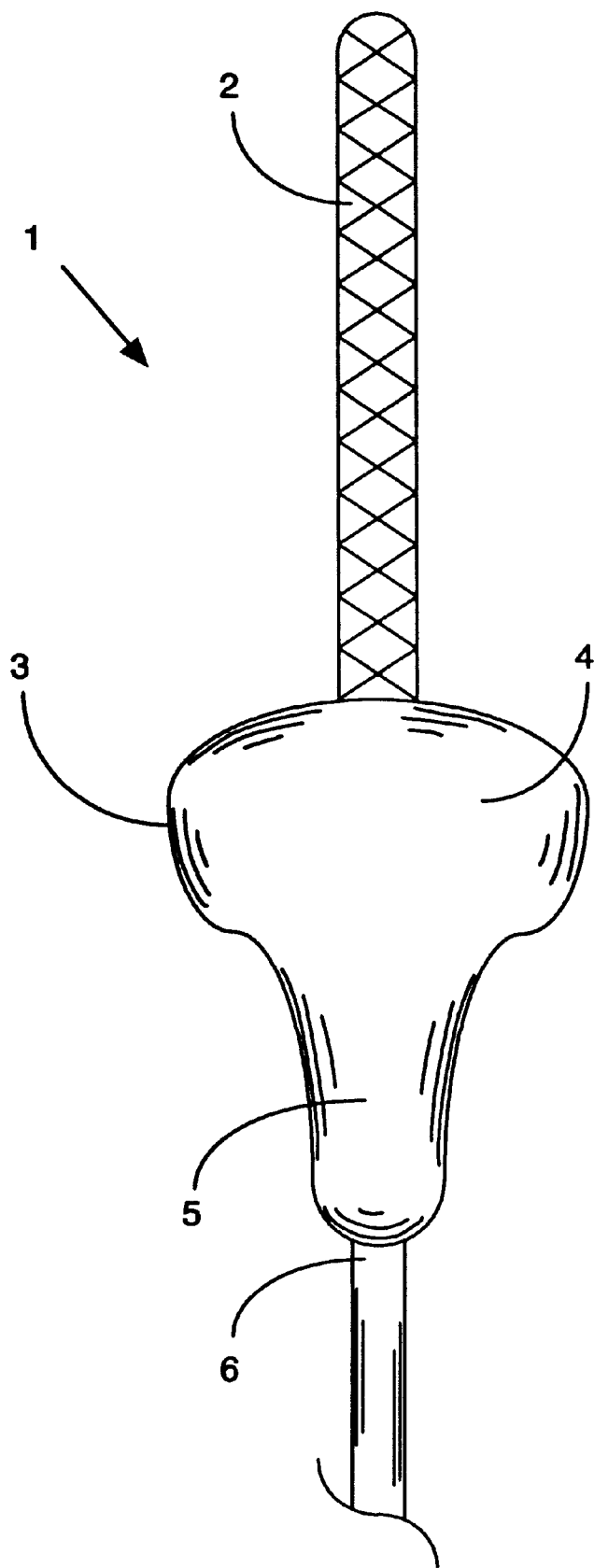
FIG. 1 is a top view of a section of a bicycle equipped with a prior art bicycle seat.

Referring to FIG. 1, this figure shows a top view of a section of a bicycle 1 equipped with a prior art bicycle seat 3. A bicycle tire 2 is shown extending outward and to the rear of the bicycle seat 3 and the bicycle frame 6 is shown extending outward and to the front of the bicycle seat 3. As can be seen from this view, bicycle seat 3 has a seating platform 4 and a central extension 5. On a typical bicycle seat 3, the central portion of the seating platform 4 and the central extension 5 are as high as or higher than the rest of the upper surface of the bicycle seat 3. As a result, when a rider is riding the bicycle 1 the central longitudinal portion of the bicycle seat 3 supports a substantial amount of the rider's weight.

A disadvantage associated with this structure is that it applies continuous pressure to the central seating area of the rider's body. For the purpose of this discussion, the central seating area of the rider's body is that portion which extends from the base of the rider's spine in the back, between the rider's legs, and then forward to the rider's genitals. Regardless of the sex of the rider, continuous pressure on this small area of the rider's body will result in discomfort to the rider and detract from the enjoyment which may otherwise be available from using the bicycle.

The more serious disadvantage of the structure is the potential injury it may inflict on the rider. In particular, the circulatory system of males provides for the delivery of blood to the genitalia via blood vessels that are crucial to the formation and maintenance of an erection. It has been found that males who spend substantial amounts of time riding bicycles may develop sexual dysfunctions as a result of the constant and frequent pressure on the aforementioned blood vessels. This is because the constant pressure weakens the blood vessel walls and eventually results in a reduction in the capacity of the blood vessels to carry sufficient volumes of blood that are required to acquire and maintain an erection. Primary cause of this problem is the structure of the prior art bicycle seat 3 which focuses the pressure created by the rider's weight on the blood vessels of the rider.

As will be discussed more fully in the discussion of the following figures, the invention disclosed herein distributes the weight of the rider away from the central seating area of the rider and outward toward the rider's buttocks which are better equipped to support the body weight of the rider. As a result, the pressure on the rider's blood vessels is eliminated and the rider can enjoy bicycling without concern for long term health risks.

Figure 2:
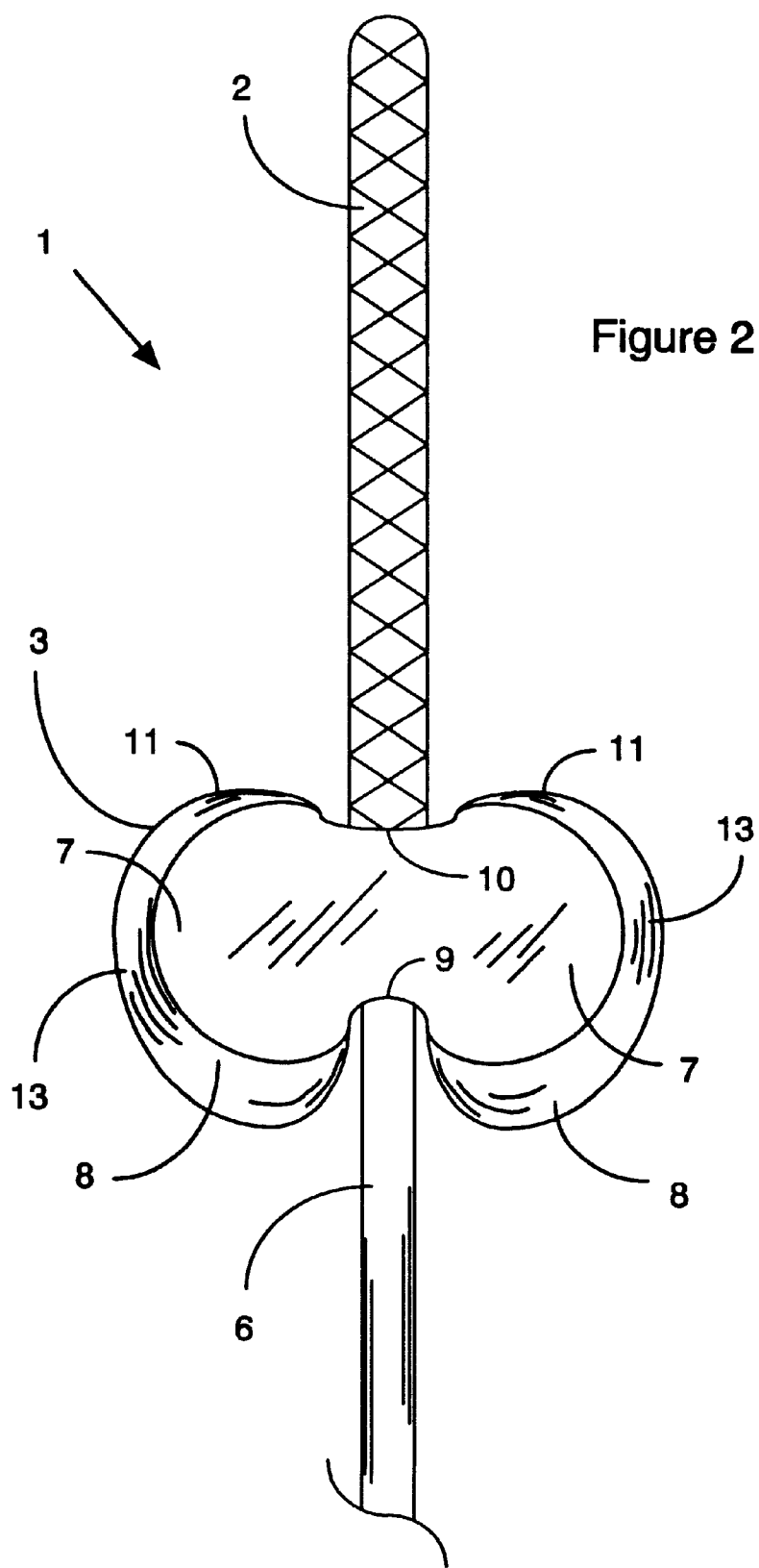
FIG. 2 is a top view of a preferred embodiment of the invention illustrating the reduced longitudinal length of the central section of the bicycle seat and the extended seating surface used to distribute weight outward from the central seating area of the rider's body to the rider's buttocks.

In FIG. 2, a top view of a preferred embodiment of the bicycle seat 3 provided by this invention is shown. In this embodiment, the longitudinal length of the central section of the bicycle seat 3 is reduced to minimize the amount of contact with the central seating area of the rider. This is provided by a front central indentation 9 and a rear central indentation 10. In addition, an extended seating surface 7 is provided to increase the amount of seating area available for use by the rider's buttocks. By so doing, the extended seating surface 7 provides support for a larger percentage of the rider's weight, and reduces the amount of weight that has to be supported by the central seating area rider's body. The result of the structure provided by this embodiment is that the rider's body weight is distributed outward from the central seating area of the rider's body to the rider's buttocks. This substantially reduces the pressure applied to blood vessels associated with a male rider's genitalia and reduces the negative effects of extended bicycle riding on the ability of a male to form and maintain an erection.

Also shown in this figure are optional front sloped surfaces 8 which extend forward downward from the extended seating surface 7. The extending these surfaces downward, they do not interfere with the motion of the rider's legs while peddling the bicycle 1, but they do provide support for the rider's legs when in the lowered position during peddling. Also shown in this figure are optional rear sloped surfaces 11 and optional side sloped surfaces 13. An additional advantage provided by sloping the edges of the bicycle seat 3 away from the extended seating area 7 is that the rider is not bothered by an abrupt edge, and as a result will be more comfortable when riding for extended periods of time.

Figure 3:
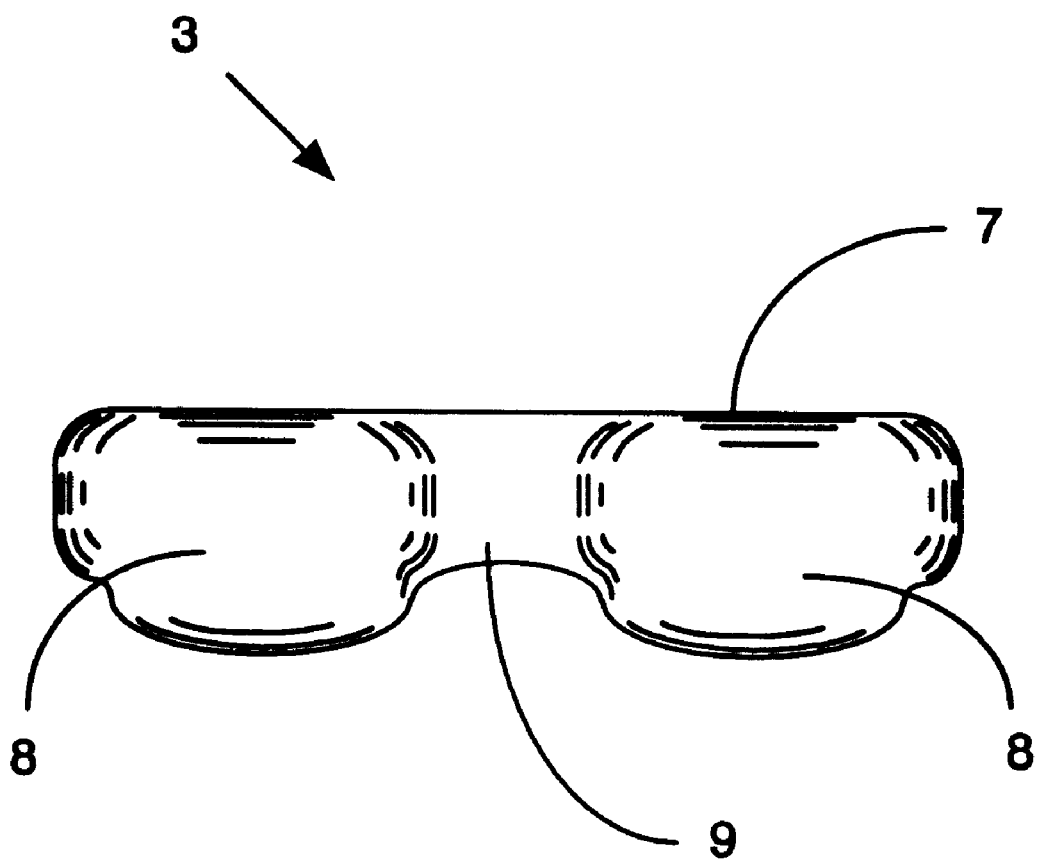
FIG. 3 is a front edge view of the embodiment of FIG. 2 which illustrates the optional left front and right front sloped surfaces which extend outward and downward from the bicycle seat.

FIG. 3 is a front edge view of the embodiment of FIG. 2. This can be seen from this view, the extended seating surface 7 provides a substantially wider seating surface for the rider which acts to distribute the weight of the rider across a larger area. As a result, pressure on the central seating area of the rider is correspondingly reduced This figure also illustrates the optional extension of the left front and right front sloped surfaces 8 which extend outward and downward from the bicycle seat 3.

Figure 4:
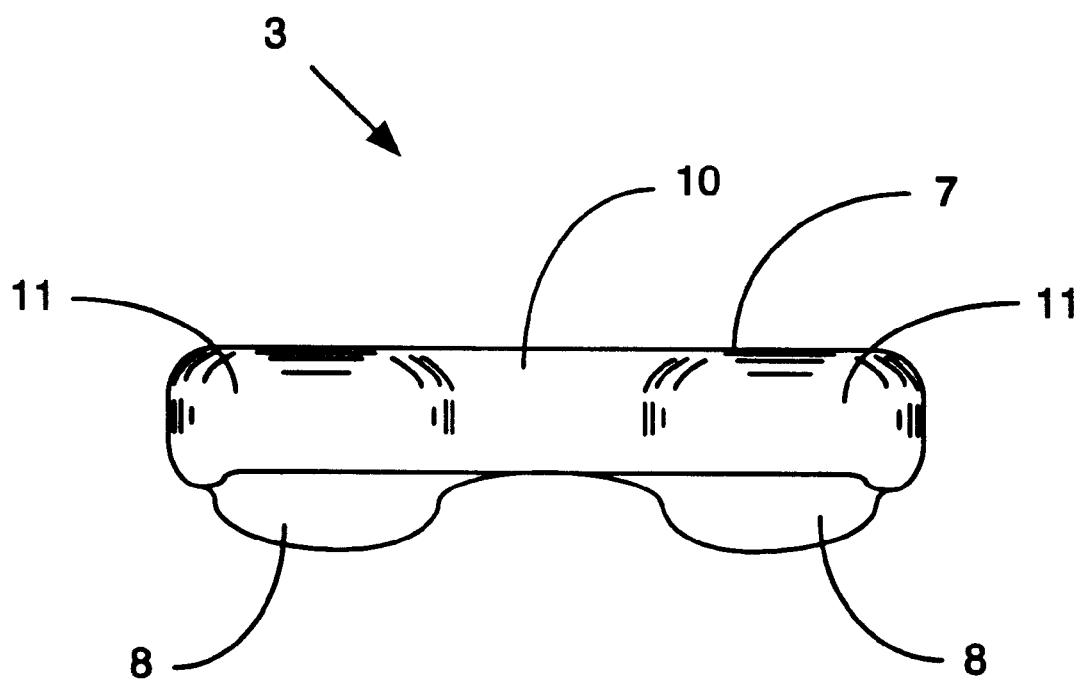
FIG. 4 is a rear edge view of the embodiment of FIG. 2 which illustrates the optional left front and right front sloped surfaces extending below the rear edge of the bicycle seat.

FIG. 4 is a rear edge view of the embodiment of FIG. 2 which illustrates the left front and right front sloped surfaces 8 extending below the rear slope of the bicycle seat 3. Also shown in this figure is the rear central indentation 10 and the rear sloped surfaces 11.

Figure 5:
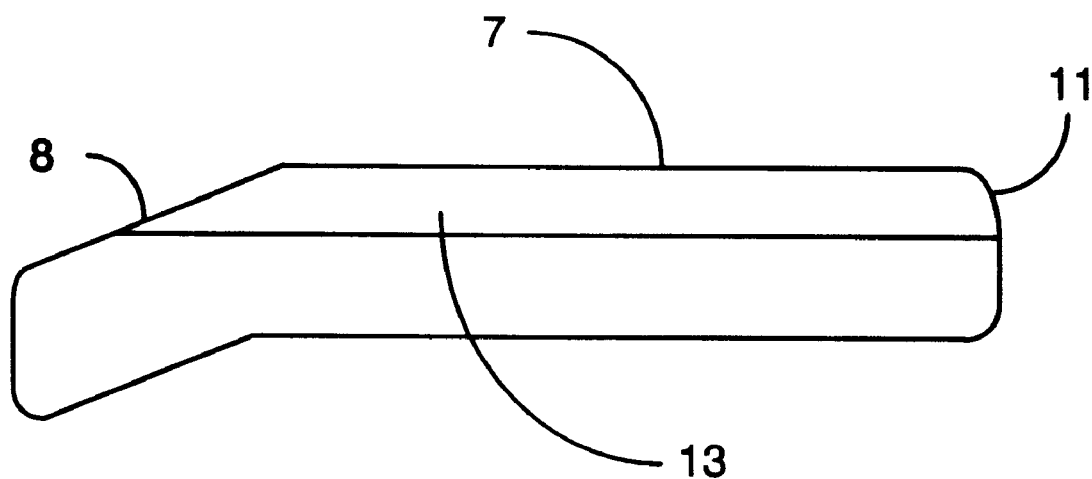
FIG. 5 is a side edge view of the embodiment FIG. 2 which illustrates the front sloped surfaces extending forward and downward from the bicycle seat.

FIG. 5 is a side edge view of the embodiment FIG. 2 which illustrates the front sloped surfaces 8 extending forward and downward from the extended seating surface 7 of the bicycle seat 3. In addition, the side sloped surface 13 and the rear sloped surface 11 are shown.

Figure 6:
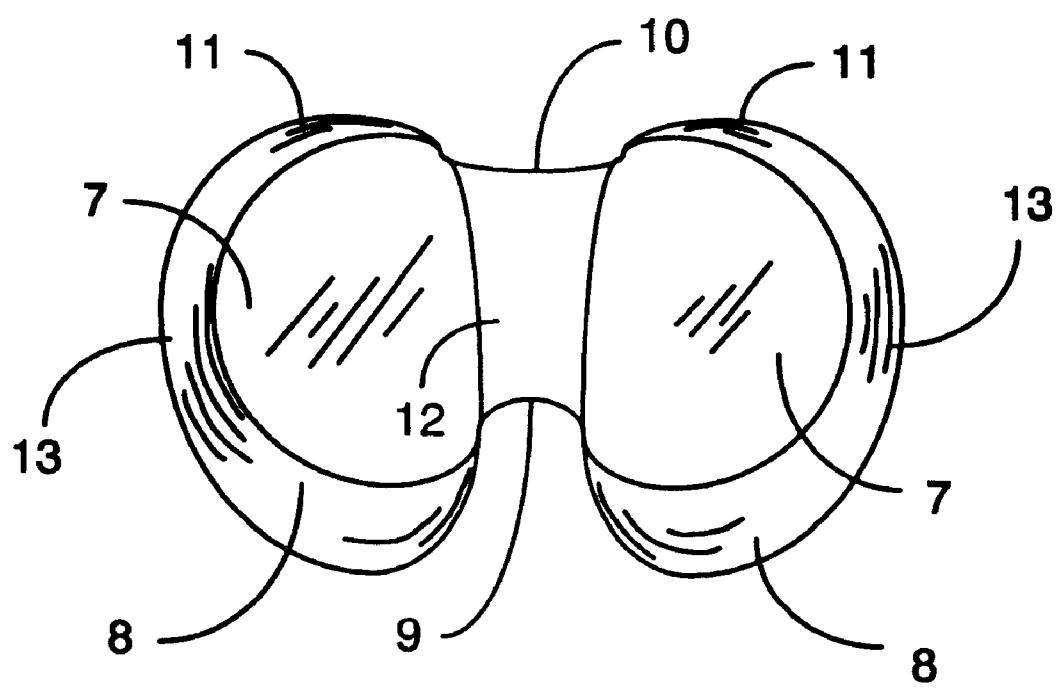
FIG. 6 is an alternative preferred embodiment in which an optional central cavity is longitudinally formed in the upper surface of the bicycle seat to minimize or eliminate contact between the bicycle seat and the central seating area of the rider's body.

FIG. 6 is an alternative preferred embodiment in which an optional central cavity 12 is longitudinally formed in the upper surface of the extended seating area 7 of the bicycle seat 3. By forming central cavity 12 in this manner, contact between the extended seating area 7 of the bicycle seat 3 and the central seating area of the rider's body is minimized or eliminated. This embodiment provides an improvement over the previous embodiment in that it further reduces contact between the bicycle seat 3 and the central seating area of the rider's body. As can be seen, this embodiment distributes substantially all of the support for the rider's weight to the rider's buttocks. Accordingly, the risk of injury to, or sexual dysfunction in, male riders is greatly reduced.

Figure 7:
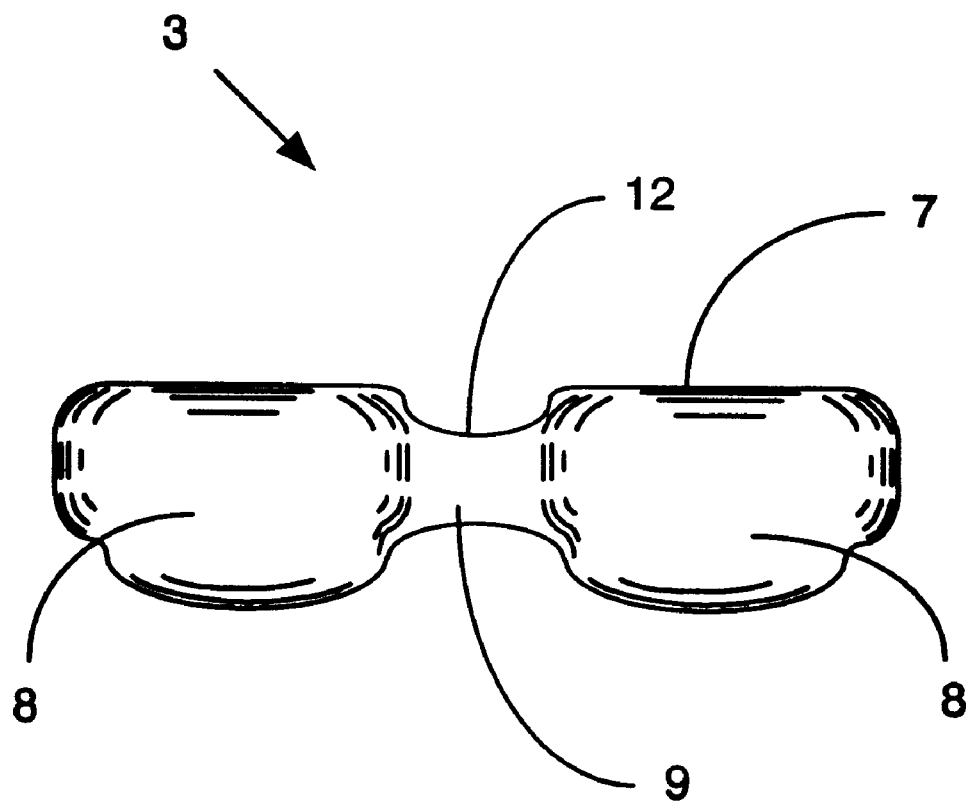
FIG. 7 is a front edge view of the embodiment of FIG. 6 which illustrates the central cavity in relation to the left and right seating surfaces of the bicycle seat.

FIG. 7 is a front edge view of the embodiment of FIG. 6 which illustrates the central cavity 12 in relation to the left and right seating surfaces 7 of the bicycle seat 3. This view better illustrates the relevant positions of the extended seating surfaces 7 in relation to the surface of central cavity 12.

Figure 8A:
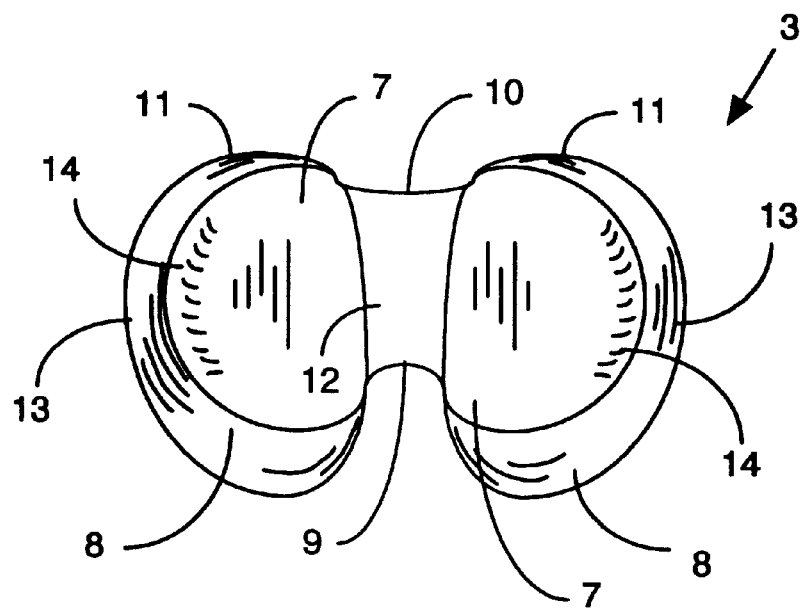
FIG. 8A is a top plan view of an alternative preferred embodiment in which side supports are included on the outside edges of the left and right seating surfaces.

FIG. 8A is an alternative preferred embodiment which is designed to further improve the comfort of the bicycle rider. This embodiment includes a raised side edge 14 which extends along a portion of the outside edge of the seating surface 7 on the bicycle seat 3. The raised side edge 14 provides support for the rider's buttocks and legs, and helps the rider remain seated in the proper position while bicycling. The length of the raised side edge 14 can vary. In addition, those skilled in the art will recognize that the rise angle can vary to suit a particular rider's physique.

Figure 8B:
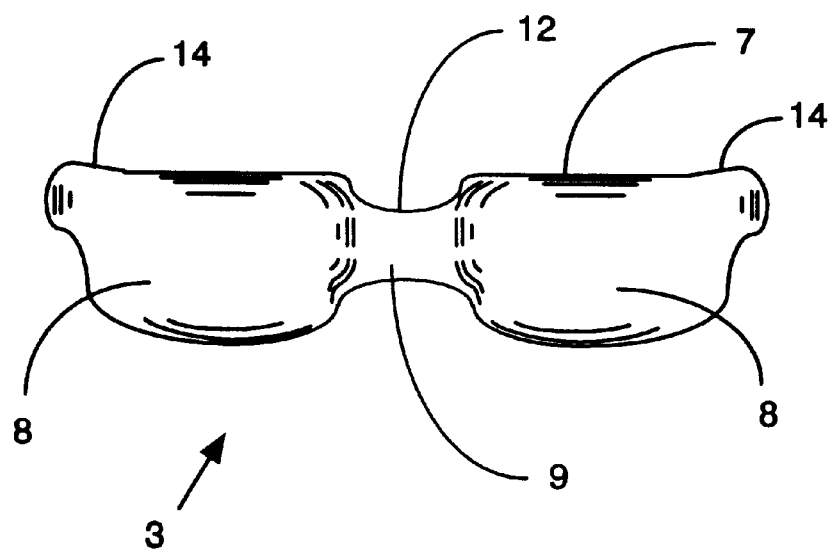
FIG. 8B is a front edge view of the embodiment FIG. 8 which illustrates the raise surfaces of the side supports on the outside edges of the left and right seating surfaces.

FIG. 8B, a front edge view of the embodiment of FIG. 8 is shown. In this view, the raised side edge 14 is shown extending upward from the seating surface 7 toward the outside edge of the bicycle seat 3. For ease of illustration, the raised side edges 14 were illustrated in combination with the embodiment of FIGS. 6 and 7. However, those skilled in the art will recognize that the raised side edges 14 can be incorporated into any of the embodiments herein.

Figure 9A:
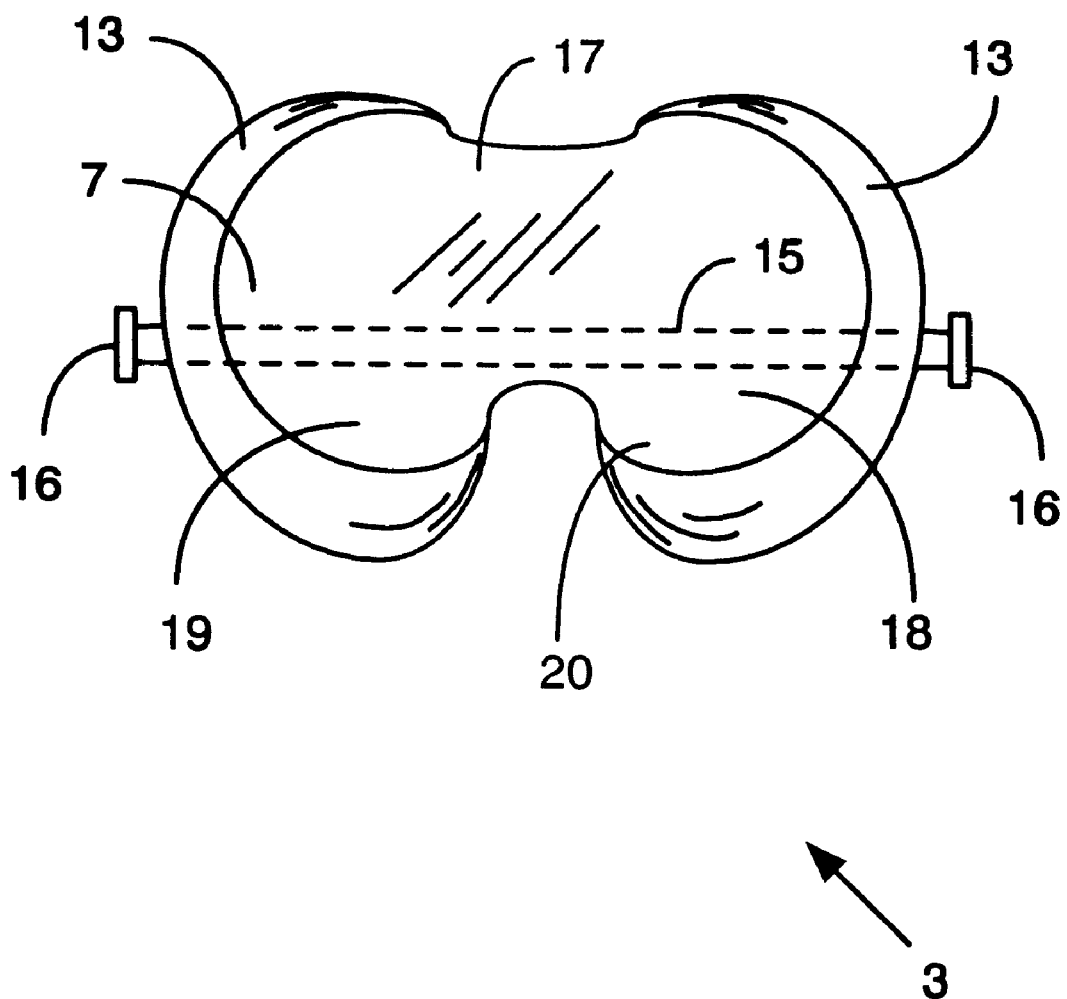
FIG. 9A is a top plan view of another preferred embodiment which uses adjustable hinged leg supports.

In FIG. 9A, an alternative preferred embodiment is shown. In this embodiment, an adjustable tension spring hinge 15 is attached to bicycle seat 3. The spring hinge 15 can be mounted underneath the bicycle seat 3, or mounted internally as an integral component of the bicycle seat. For ease of illustration, the portion of the spring hinge 15 which is not visible when viewing the top surface of the bicycle's seat 3 is illustrated with dashed lines. In this embodiment, the spring hinge 15 extends out from the sides of the bicycle seat 3 so that the rider can easily reach tension adjustment knobs 16. Of course, the spring hinge 15 can be sized such that the tension adjustment knobs 16 are located below the bicycle seat 3 and not visible from above.

The spring hinge 15 is positioned such that the seating surface 7 is divided into a stationary portion 17 and a movable hinge portion 18. The stationary portion 17 is located at the rear of the bicycle seat 3, and the movable hinge portion 18 is located at the front of the bicycle seat 3. The movable hinge portion 18 is further divided into a right leg section 19 and a left leg section 20. When the bicycler is peddling, the right and left leg sections 19, 20 move with the bicycler's legs to increase the comfort of the bicycler. The section under each leg moves independently of the section under the other leg.

The purpose of having an adjustable tension spring hinge 15 is to allow the bicycler to adjust the tension on the movable hinge portion 18 to suit the bicycler's personal tastes. Tension is adjusted to control the pressure required to move the movable hinge portion 18 down under pressure of the bicycler's leg. While the tension adjustment knobs 16 can be eliminated if a non-adjustable spring is used, the use of a non-adjustable spring does not allow the bicycler to adjust the tension to suit the bicycler's personal comfort.

Figure 9B:
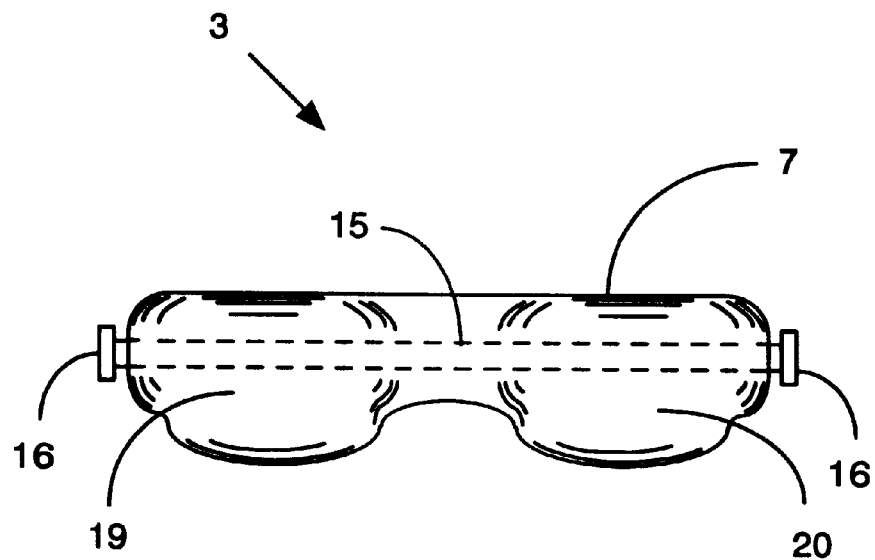
FIG. 9B is a front edge view of the embodiment of FIG. 9A in which the adjustable tension spring hinge the showing integrated with the bicycle seat.

In FIG. 9B, a front edge view of the embodiment of FIG. 9A is shown. This figure illustrates the tension adjustment knobs 16 projecting from the side edges of the bicycle seat 3. Those skilled in the art will recognize that a single tension adjustment knob 16 can be used, although a single knob is less convenient than the two knobs illustrated.

Figure 9C:
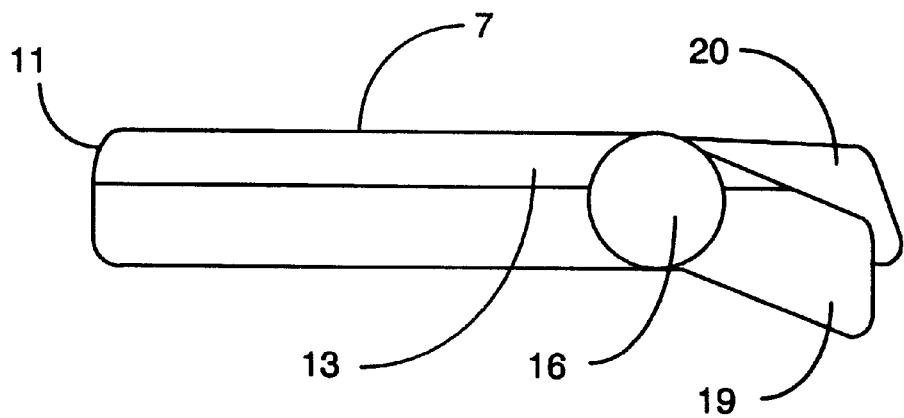
FIG. 9C is a side edge view of the embodiment of FIGS. 9A and 9B which illustrates the right leg section in the lowered position and the left leg section in the raised position.

FIG. 9C is a side edge view of the embodiment of FIGS. 9A and 9B which illustrates the right leg section in the lowered position and the left leg section in the raised position. This figure illustrates more clearly the independent motion of the right leg section 19 in relation to the left leg section 20.

The adjustable spring hinge 15 was illustrated in combination with the seating surface 7 of the embodiment of FIGS. 2–5. However, the adjustable spring hinge 15 can be implemented on the other embodiments disclosed herein, such as those shown in FIGS. 6–8.

Figure 10A:
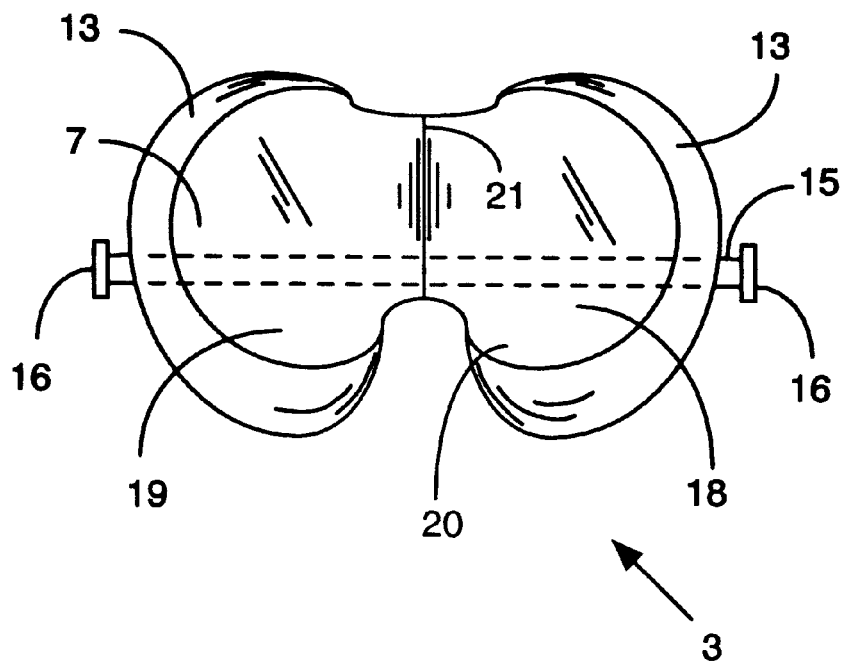
FIG. 10A is a top view that illustrates another alternative embodiment in which a longitudinal center ridge is formed on the seating surface.

FIG. 10A is a top surface view of another embodiment in which a central ridge 21 is used to provide additional support for the rider's buttocks. The central ridge 14 can be used with other optional features such as the raised side edges 14 shown in FIGS. 8A–8B, and the spring hinge 15 shown in FIGS. 9A–9C.

Figure 10B:
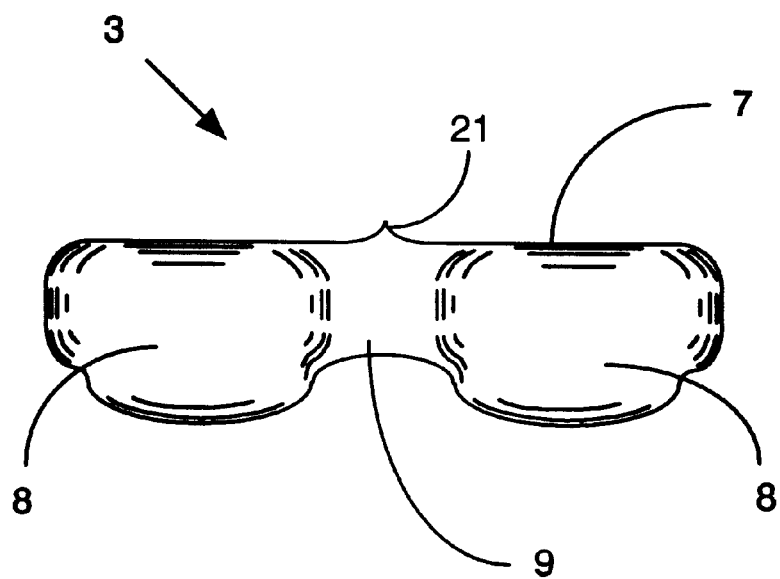
FIG. 10B is a front edge view of the embodiment of FIG. 10A which illustrates the longitudinal center ridge formed on the seating surface.

In FIG. 10B, a front edge view of the embodiment of FIG. 10A is illustrated. As can be seen, the central ridge 14 extends upward from the seating surface 7 to provide to additional support for the rider's buttocks.

Figure 11A:
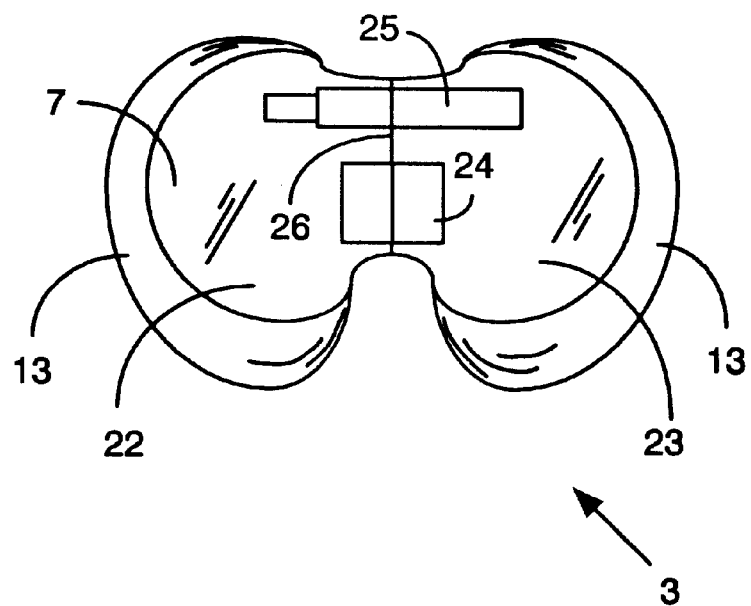
FIG. 11A is a top view that illustrates another alternative embodiment in which the bicycle seat is divided longitudinally into left and right halves which may be laterally extended from a closed to an open position to allow the rider to adjust the width of the seat. The view in this figure shows the bicycle seat in the closed position.

FIG. 11A is a top transparent view that illustrates another alternative embodiment in which the width of the bicycle seat 3 is adjustable. The bicycle seat 3 is divided longitudinally along seam 26 into a right side 22 and a left side 23. The right and left sides 22, 23 are illustrated in this figure with the bicycle seat 3 in the closed position.

The right and left sides 22, 23 were supported by adjustable supports 24, 25. The adjustable supports 24, 25 are secured to the right and left sides 22, 23 of the bicycle seat 3 on their respective ends such that when the right and left sides 22, 23 are pulled apart, the adjustable supports 24, 25 will extend and support the right and left sides 22, 23 such that the bicycle seat 3 will have an increased width. In the preferred embodiment, the adjustable supports 24, 25 are also secured to the seat post (not shown). For use of illustration, the seat post was omitted from the drawing. In addition, the adjustable supports 24, 25 can also be implemented as an integral part of the bicycle seat 3.

The adjustable supports 24, 25 are illustrated in two different configurations to emphasize the point that adjustable supports 24, 25 can be formed in a variety of configurations. Further, those skilled in the art will realize that while two adjustable supports 24, 25 are shown, this embodiment and also be implemented with a single adjustable support. The only requirement is that the adjustable support the sufficiently strong to support the body weight of the rider. Also, this adjustable width seat can be implemented in combination with features of other embodiments, discussed above.

Figure 11B:
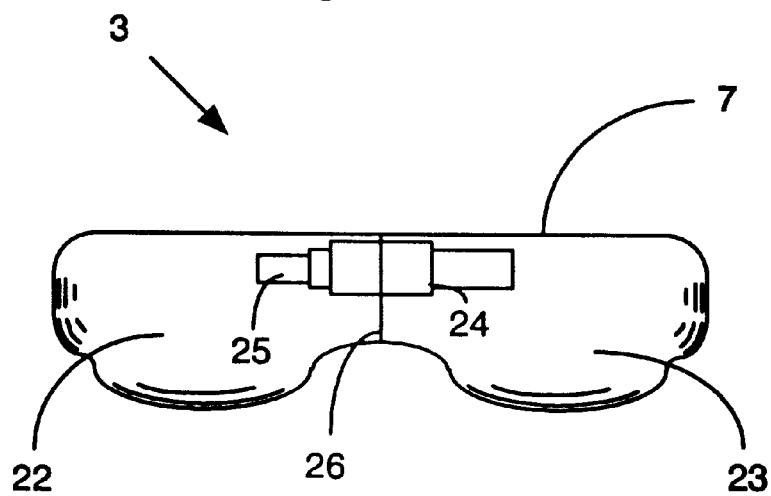
FIG. 11B is a front edge view of the embodiment of FIG. 11A which illustrates the bicycle seat in the closed position.

FIG. 11B is a front edge view of the embodiment of FIG. 11A which illustrates the bicycle seat in the closed position.

Figure 11C:
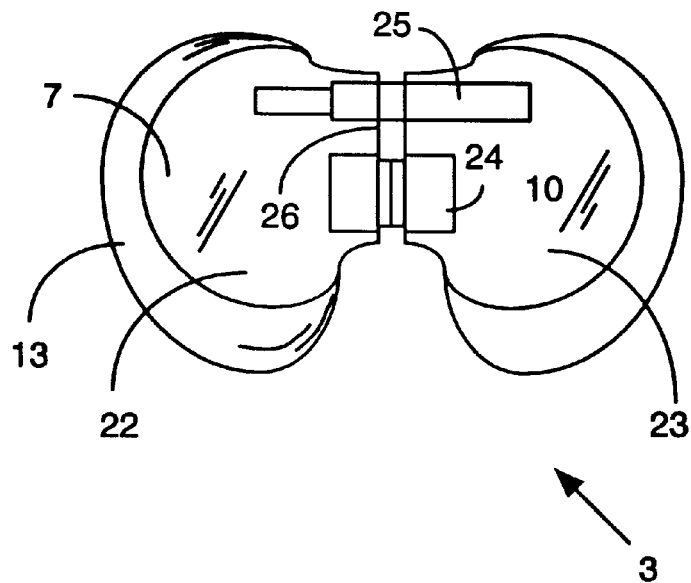
FIG. 11C is a top view of the embodiment of FIG. 11A with the bicycle seat in the partially opened position.

FIG. 11C illustrates the embodiment of FIG. 11A with the bicycle seat in the partially opened position. In this position, the right and left sides 22, 23 have been pulled apart to partially extend the width of the bicycle seat 3. The advantage of this embodiment is that allows individuals of varying sizes to adjust the width of the bicycle seat 3 to accommodate that particular individual's needs.

Figure 11D:
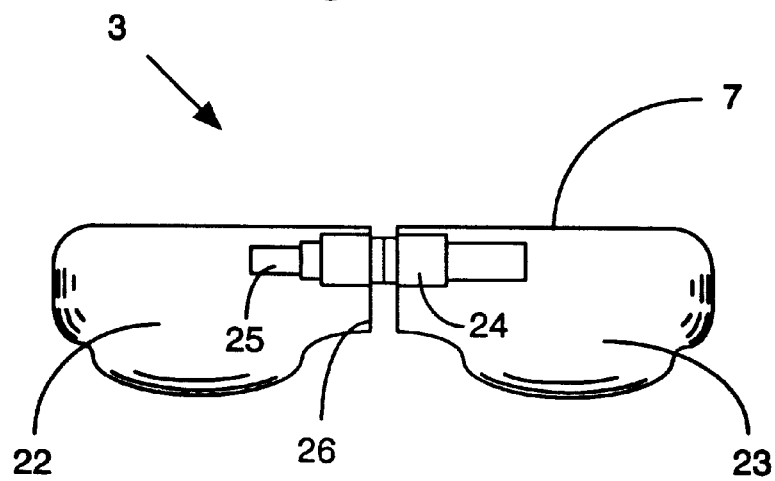
FIG. 11D is a front edge view of the embodiment of FIG. 11C with the bicycle seat in the partially opened position.

FIG. 11D is a front edge view of the embodiment of FIG. 11C. In this figure, the right and left sides 22, 23 are separated from one another.

Figure 11E:
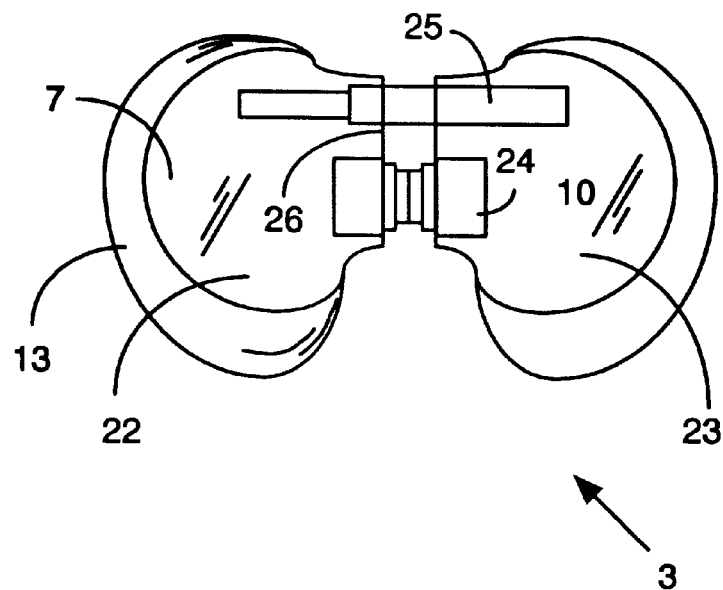
FIG. 11E is a top view of the embodiment of FIG. 11A with the bicycle seat in the fully opened position.

FIG. 11E shows the embodiment of FIG. 11A with the bicycle seat in the fully opened position. Those skilled in the art will recognize that while only three positions (closed, partially opened, and opened) were shown, any convenient number of positions and be selected. Further, the bicycle seat 3 can be designed to move continuously from the opened to the closed positions with no preset stop points.

Figure 11F:
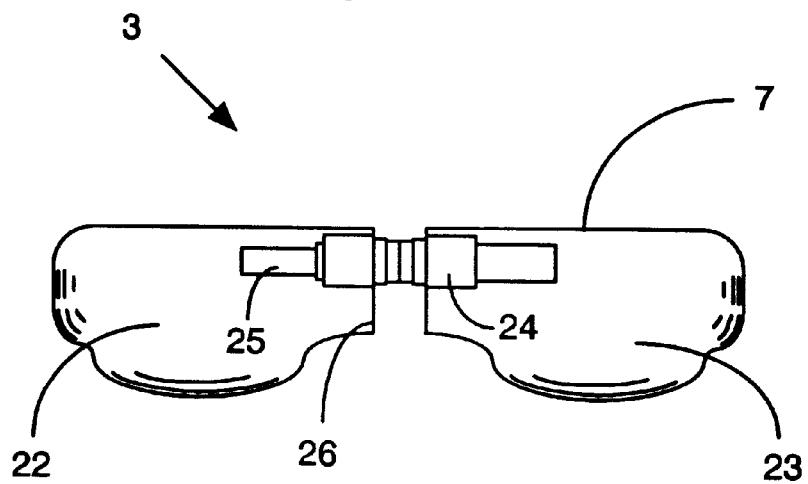
FIG. 11F is a front edge view of the embodiment of FIG. 11E with the bicycle seat in the fully opened position.

FIG. 11F is a front edge view of the embodiment of FIG. 11E with the bicycle seat in the fully opened position. In the fully opened position, the right and left sides 22, 23 are as far apart as possible and the bicycle seat 3 is at its maximum width.

The various features of the bicycle seat 3 can be used alone in combination to enhance comfort of the rider. More importantly, the structure of the bicycle seat provided by the invention allows a bicycle rider to enjoy the use of the bicycle without risking physical injury which is possible when using a conventional bicycle seat.

While the invention has been described with respect to a preferred embodiment thereof it will be understood by those skilled in the art that various changes in detail may be made therein without departing from the spirit, scope, and teaching of the invention. For example, the material used to construct the bicycle seat may be anything suitable for its intended use. The size and shape of the bicycle seat can vary. For example, the extended seating surface can take any convenient shape so long as rider weight is distributed away from the central seating area of the rider. Likewise, the size and angle of the sloped sides may vary based on the size of the device for the size of the intended rider, etc. Accordingly, the invention herein disclosed is to be limited only as specified in the following claims.

I claim:

1. A distributed weight bicycle seat with reduced central seating area, comprising:
   an upper seating surface further comprising:
      a widened left and right seating area extending laterally outward on each side of the upper seating surface for support of a rider's weight; and
      the left and right seating area further comprise forward left and right leg extensions to support the legs of the rider, the left leg extension attached to the left seating area and the right leg extension attached to the right seating area such that they slope downward from the seating surface and extend toward the front of the bicycle, and further, the left and right leg extensions are attached to the left and right seating area, respectively, with a spring loaded hinge;
      the spring loaded hinge further having a tension adjustable spring; and a tension adjustment knob attached to the tension adjustable spring such that the rider can adjust the tension provided by the spring loaded hinge;
      a central seating area having a longitudinal length that is reduced such that contact with the rider's groin area is substantially avoided; and
   attachment means to attach the upper seating surface to a bicycle;
   whereby the rider's weight is distributed away from the rider's groin area by reducing contact between the rider's groin area and the bicycle seat, the left and right leg extensions do not interfere with the rider's legs when the rider is peddling the bicycle, and the left and right extensions move with the rider's legs when the rider is peddling the bicycle.

2. A bicycle seat, as in claim 1, further comprising:
   a central cavity extending longitudinally along the central portion of the upper surface bicycle seat such that weight of the rider supported by the left and right seating area and contact between the bicycle seat and the groin area is substantially avoided;
   whereby the left and right seating areas support the weight of the rider and the groin area of rider is elevated above the surface of the central cavity.

3. A bicycle seat, as in claim 1, further comprising:
   a raised outside edge on the surface of the widened left and right seating area;
   whereby the seating surface curves upward on the outside edges to support the rider.

4. A bicycle, as in claim 1, further comprising a central ridge in the surface of bicycle seat, the central ridge positioned such that support for the buttocks of the rider is provided while substantially avoiding contact with the groin area of the rider.

5. A distributed weight bicycle seat with reduced central seating area, comprising:
   an upper seating surface further comprising:
      a widened left and right seating area extending laterally outward on each side of the upper seating surface for support of a rider's weight;
      a central seating area having a longitudinal length that is reduced such that contact with the rider's groin area is substantially avoided; and
   attachment means to attach the upper seating surface to a bicycle;
   a longitudinal seam extending from the front to the rear of the bicycle seat and located substantially in the center of the bicycle seat, the longitudinal seam separating the bicycle seat into left and right sides; and an adjustable support laterally attached to the bicycle seat such that a first end of the adjustable support is attached to the left side of the bicycle seat and a second end of the bicycle seat is attached to the right side of the bicycle seat, the adjustable support is laterally expandable such that the right and left sides of the bicycle seat can be pulled laterally apart from one another from a closed position to an open position;

whereby the rider's weight is distributed away from the rider's groin area by reducing contact between the rider's groin area and the bicycle seat and the rider can adjust the width of the bicycle seat to accommodate the rider's personal comfort.

6. A bicycle seat with reduced central seating area, comprising:

an upper seating surface further comprising:
a widened left and right seating area extending laterally outward on each side of the upper seating surface for support of a rider's weight;
the left and right seating area further comprise forward left and right leg extensions to support the legs of the rider, the left leg extension attached to the left seating area and the right leg extension attached to the right seating area such that they slope downward from the seating surface and extend toward the front of the bicycle;
the left and right leg extensions are attached to the left and right seating area, respectively, with a spring loaded hinge, the spring loaded hinge further comprising a tension adjustable spring and a tension adjustment knob attached to the tension adjustable spring such that the rider can adjust the tension provided by the spring loaded hinge;
a central seating area having a longitudinal length that is reduced such that the bicycle seat does not extend forward direction under the rider's groin area; and
a central cavity extending longitudinally along the central portion of the upper surface bicycle seat such that weight of the rider supported by the left and right seating area and contact between the bicycle seat and the groin area is substantially avoided; and
attachment means to attach the upper seating surface to a bicycle;
whereby the left and right seating areas support the weight of the rider and the groin area of the rider is elevated above the surface of the central cavity, the left and right extensions move with the rider's legs when the rider is peddling the bicycle.

7. A bicycle seat, as in claim 6, further comprising:
a raised outside edge on the surface of the widened left and right seating area;
whereby the seating surface curves upward on the outside edges to support the rider.

8. A bicycle, as in claim 6, further comprising a central ridge in the surface of bicycle seat, the central ridge is positioned such that support for the buttocks of the rider is provided while substantially avoiding contact with the groin area of the rider.

9. A bicycle seat with reduced central seating area, comprising:

an upper seating surface further comprising:
a widened left and right seating area extending laterally outward on each side of the upper seating surface for support of a rider's weight;
the left and right seating area further comprise forward left and right leg extensions to support the legs of the rider, the left leg extension attached to the left seating area and the right leg extension attached to the right seating area such that they slope downward from the seating surface and extend toward the front of the bicycle;
a central seating area having a longitudinal length that is reduced such that the bicycle seat does not extend forward direction under the rider's groin area; and
a central cavity extending longitudinally along the central portion of the upper surface bicycle seat such that weight of the rider supported by the left and right seating area and contact between the bicycle seat and the groin area is substantially avoided; and
attachment means to attach the upper seating surface to a bicycle;
a longitudinal seam extending from the front to the rear of the bicycle seat and located substantially in the center of the bicycle seat, the longitudinal seam separating the bicycle seat into left and right sides; and
an adjustable support laterally attached to the bicycle seat such that a first end of the adjustable support is attached to the left side of the bicycle seat and a second end of the bicycle seat is attached to the right side of the bicycle seat, the adjustable support is laterally expandable such that the right and left sides of bicycle seat can be pulled laterally apart from one another from a closed position to an open position;
whereby the left and right seating areas support the weight of the rider and the groin area of the rider is elevated above the surface of the central cavity, and the rider can adjust the width of the bicycle seat to accommodate the rider's personal comfort.

10. A method of distributing weight on a bicycle seat away from the groin area of the rider, including the steps of:
extending the size of a bicycle seat with an upper seating surface such that the upper seating surface extends laterally outward on each side to provide support for a rider's weight;
forming a central cavity extending longitudinally along the central portion of the upper surface bicycle seat such that weight of the rider supported by the left and right seating area and contact between the bicycle seat and the groin area is substantially avoided;
reducing the longitudinal length of a central seating area on the upper seating surface such that contact with the rider's groin area is substantially avoided;
forming a longitudinal seam that extends from the front to the rear of the bicycle seat and locating it substantially in the center of the bicycle seat such that the longitudinal seam separates the bicycle seat into left and right sides;
attaching an adjustable support to the bicycle seat such that a first end of the adjustable support is attached to the left side of the bicycle seat and a second end of the bicycle seat its attached to the right side of the bicycle seat, the adjustable support is laterally expandable such that the right and left sides of the bicycle seat can be pulled laterally apart from one another from a closed position to an open position; and
attaching the upper seating surface to a bicycle;
whereby the rider's weight is distributed away from the rider's groin area by reducing contact between the rider's groin area and the bicycle seat, the left and right seating areas support the weight of the rider and the groin area of rider is elevated above the surface of the central cavity, and the rider can adjust the width of the bicycle seat to accommodate the rider's personal comfort.

11. A method, as in claim 10, including the additional steps of:

forming left and right leg extensions on the left and right sides of the bicycle seat to support the legs of the rider, the left and right leg extensions attached such that they slope downward from the seating surface and extend toward the front of the bicycle;

whereby the left and right leg extensions do not interfere with the rider's legs when the rider is peddling the bicycle.

12. A method, as in claim 11, including the additional step of attaching the left and right leg extensions to the left and right seating area with a spring loaded hinge;

whereby the left and right extensions move with the rider's legs when the rider is peddling the bicycle.

13. A method of distributing weight on a bicycle seat away from the groin area of the rider, including the steps of:

extending the size of a bicycle seat with an upper seating surface such that the upper seating surface extends laterally outward on each side to provide support for a rider's weight;

reducing the longitudinal length of a central seating area on the upper seating surface such that contact with the rider's groin area is substantially avoided;

attaching the upper seating surface to a bicycle;

forming a central cavity extending longitudinally along the central portion of the upper surface bicycle seat such that weight of the rider supported by the left and right seating area and contact between the bicycle seat and the groin area is substantially avoided;

forming left and right leg extensions on the left and right sides of the bicycle seat to support the legs of the rider, the left and right leg extensions attached such that they slope downward from the seating surface and extend toward the front of the bicycle;

attaching the left and right leg extensions to the left and right seating area with a spring loaded hinge;

using a tension adjustable spring in the spring loaded hinge; and attaching a tension adjustment knob to the tension adjustable spring such that the rider can adjust the spring tension;

whereby the rider's weight is distributed away from the rider's groin area by reducing contact between the rider's groin area and the bicycle seat, the left and right seating areas support the weight of the rider and the groin area of rider is elevated above the surface of the central cavity, the left and right leg extensions do not interfere with the rider's legs when the rider is peddling the bicycle, and the left and right extensions move with the rider's legs when the rider is peddling the bicycle.

* * * * *